(12) United States Patent  
Finkler

(10) Patent No.: US 8,175,834 B2  
(45) Date of Patent: May 8, 2012

(54) MEASUREMENT SYSTEM AND METHOD FOR MONITORING THE MEASUREMENT SYSTEM

(75) Inventor: Roland Finkler, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 548 days.

(21) Appl. No.: 12/355,293

(22) Filed: Jan. 16, 2009

(65) Prior Publication Data

US 2009/0192747 A1   Jul. 30, 2009

(30) Foreign Application Priority Data

Jan. 18, 2008   (EP) ..................................... 08000961

(51) Int. Cl.
*G06F 19/00* (2011.01)
(52) U.S. Cl. ........................................................ 702/89
(58) Field of Classification Search ....................... 702/89
See application file for complete search history.

(56) References Cited

U.S. PATENT DOCUMENTS

| | | | |
|---|---|---|---|
| 4,665,353 A * | 5/1987 | Salazar et al. ................. | 318/599 |
| 2006/0006861 A1 * | 1/2006 | Heinze et al. ............ | 324/207.21 |

FOREIGN PATENT DOCUMENTS

| | | |
|---|---|---|
| DE | 27 29 697 | 1/1979 |
| DE | 35 86 937 T2 | 6/1993 |
| DE | 202004000413 U1 | 4/2004 |
| EP | 0 158 781 A1 | 2/1985 |
| EP | 0 362 407 A1 | 4/1990 |
| EP | 0 431 195 A1 | 6/1991 |
| EP | 1 205 728 A2 | 5/2002 |
| JP | 59-72547 * | 4/1984 |
| JP | 61155789 A | 7/1986 |
| JP | 63-300911 | 12/1988 |
| JP | 64059096 A | 3/1989 |
| JP | 2000061775 A | 2/2000 |
| JP | 2007 292691 | 11/2007 |

* cited by examiner

*Primary Examiner* — Cindy H Khuu
(74) *Attorney, Agent, or Firm* — Henry M. Feiereisen; Ursula B. Day

(57) ABSTRACT

In a method for monitoring a measurement system having a transmitter which determines the position of a moveable element and has a transmitter clock, and an electrical energy store which, in the event of a failure of an external electrical supply voltage for the transmitter, continues to supply electrical power to at least a part of the transmitter, including the transmitter clock. After the external electrical supply voltage has been restored, the clock time of the transmitter clock is compared with a clock time of an external clock, and an incorrectly determined position is identified on the basis of the comparison of the clock times.

9 Claims, 1 Drawing Sheet

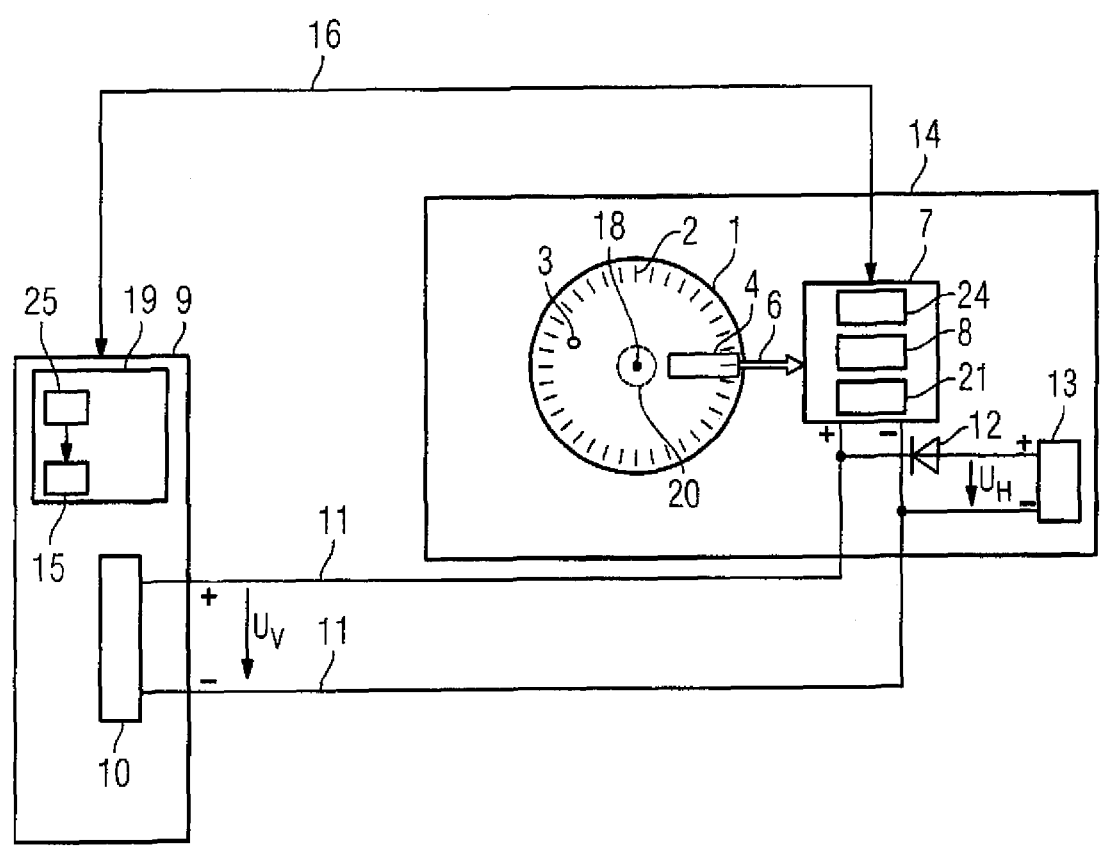

MEASUREMENT SYSTEM AND METHOD FOR MONITORING THE MEASUREMENT SYSTEM

CROSS-REFERENCES TO RELATED APPLICATIONS

This application claims the priority of European Patent Application, Serial No. 08000961, filed Jan. 18, 2008, pursuant to 35 U.S.C. 119(a)-(d), the content of which is incorporated herein by reference in its entirety as if fully set forth herein.

BACKGROUND OF THE INVENTION

The present invention relates, in general, to a measurement system and to a method for monitoring a measurement system.

Particularly in the technical field of automation engineering, measurement systems, in particular incremental measurement systems, are used to determine a position of a moveable element, such as a motor shaft of a drive for driving a machine shaft. By means of an incremental measurement system in which the transmitter has a reference mark, it is possible after moving over the reference mark to determine the absolute position, in that the increments which have been moved over can be counted without any gaps by means of a counter after moving over the reference marks (zero position). The count of the increments which have been moved over in this case corresponds to a rough position, with a fine position then being determined by interpolation, for example as described in DE 27 29 697 A1. The rough position and the fine position together provide the absolute position.

Particularly in the case of machine tools, production machines and/or robots, measurement systems such as these are usually supplied during normal operation with electrical power from an open-loop and/or closed-loop control device which is used for open-loop and/or closed-loop control of moveable elements of the machine. If the open-loop and/or closed-loop control device is switched off, then, in many such measurement systems, the count for the increments which have been moved over is lost and/or increments which are moved over after switch-off are no longer also counted. Once the open-loop and/or closed-loop control device has been switched on again, the reference mark must first of all be moved over again in measurement systems such as these, in order to allow the absolute position to be determined.

EP 0 362 407 A1 attempts to address this problem by providing a battery which supplies the measurement system even after the open-loop and/or closed-loop control device has been switched off. Power is hereby not supplied to all the electrical components of the transmitter, but only a part of the transmitter is supplied with electrical power. The transmitter is thus operated in an energy-saving mode, rather than in the normal mode. It is possible, for example, to supply only a single RAM for storage of the count (however, in this case, any movements of the moveable element when the open-loop and/or closed-loop control device is switched off, can then not be detected). It is also possible, for example, for a light-emitting diode, which is otherwise operated continuously, of an optical transmitter to be operated only on a pulsed basis and for the interpolation electronics not to be operated at all, as a result of which the fine position is no longer detected at all or is no longer detected so well, as in the normal case, but always still to adequately count the increments moved over.

This prior art has the disadvantage that, if the power supply is inadequate in the event of failure of the battery, the count of the elements which have been moved over can be deleted or changed This can occur in particular in the event of an excessively long failure of the external power supply for the transmitter, which ensures the power supply for the transmitter during normal operation. Once the open-loop and/or closed-loop control device has been switched on again, and therefore after the external electrical supply voltage has been restored for normal operation of the transmitter, there is then no longer any guarantee that the position determined by the transmitter would actually match the actual position of the moveable element, because, in the meantime, the auxiliary supply voltage produced by the battery will have fallen too far to supply adequate power at least to the important electrical components of the transmitter.

DE 20 2004 000 413 U1 discloses a transmitter which includes a non-volatile memory to store the count, with an electromechanical snap-action mechanism being used as an independent energy source. This type of mechanism is very complex.

It would therefore be desirable and advantageous to obviate prior art problems and to allow identification of an incorrectly determined position caused by failure of the electrical power supply for the transmitter.

SUMMARY OF THE INVENTION

According to one aspect of the present invention, a method for monitoring a measurement system having a transmitter for determining a position of a moveable element, includes the steps of providing the transmitter with a transmitter clock, supplying electrical power from an electrical energy store of the measurement system to at least a part of the transmitter and the transmitter clock in the event of a failure of an external electrical supply voltage for the transmitter, comparing a clock time of the transmitter clock with a clock time of an external clock, when the external electrical supply voltage has been restored, and identifying an incorrectly determined position on the basis of the comparison of the clock times.

According to another aspect of the present invention, a measurement system includes a transmitter which determines a position of a moveable element and includes a transmitter clock, an electrical energy store which supplies electrical power to at least a part of the transmitter and the transmitter clock, in the event of a failure of an external electrical supply voltage for the transmitter, and a monitoring unit which compares a clock time of the transmitter clock with a clock time of an external clock, when the external electrical supply voltage has been restored, to thereby identify the presence of an incorrectly determined position on the basis of the comparison of the clock times.

According to another advantageous feature of the present invention, the comparing step may include the steps of determining a first difference between the clock time of the transmitter clock and the clock time of the external clock, when a reference mark of the transmitter is first detected, determining a second difference between the clock time of the transmitter clock and the clock time of the external clock, when the external electrical supply voltage has been restored, and comparing the first difference with the second difference. In this way, a comparison of the clock times can be carried out without the need for the clock times to coincide. In other words, there is no need for synchronization of the clock time of the transmitter clock and the clock time of the external clock. Furthermore, this ensures that a correctly determined position can be identified by the sensor system only when a reference mark is detected for the first time. This also ensures that the determined position is in principle identified as being incorrect until an absolute position has been defined. In this case, the clock time of the transmitter clock is suitably set to a suitable value before determining the first difference.

According to another advantageous feature of the present invention, the first difference may be compared with the second difference by forming the difference between the first difference and the second difference. This represents a particularly simple comparison option.

According to another advantageous feature of the present invention, at least a part of the transmitter is additionally supplied with electrical power from the energy store, in the event of a failure of the external supply voltage for the transmitter, such as to count increments as they pass by. As a result, the count is correct even when the moveable element is moved during a failure of the supply voltage.

According to another advantageous feature of the present invention, the external clock may form a component of an open-loop and/or closed-loop control device for open-loop and/or closed-loop control of the moveable element. This avoids the need for additional hardware to provide the monitoring unit.

Furthermore, it has been found to be advantageous to design a machine tool, production machine and/or a robot having the measurement system according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic representation of a measurement system according to the present invention.

DETAILED DESCRIPTION OF PREFERRED EMBODIMENTS

The depicted embodiment is to be understood as illustrative of the invention and not as limiting in any way. It should also be understood that the figure is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic representation of a measurement system according to the present invention. The measurement system includes a transmitter 14 which has a disk 1 rotating about a rotation axis 18 connected to a moveable element which, by way of example, may be a motor shaft 20. The transmitter 14 is provided to measure a position the motor shaft 20, i.e. a rotation angle of the motor shaft 20. The transmitter 14 has hereby an incremental track which is composed of increments arranged in a circular shape. By way of example, one increment is indicated in FIG. 1 by reference symbol 2. The disk 1 is further provided with a reference mark 3. When the disk 1 carries out a rotary movement, a sensor system 4 registers a passage of the reference mark 3 and a passage of the increments 2, and transmits this information to an evaluation unit 7, as is indicated by arrow 6. The evaluation unit 7 includes a counter 21 to count the number of passing increments 2, and a memory 8 to store the count. The position of the motor shaft 20 is determined on the basis of the count and, for example, can be transmitted via a connection 16 to an open-loop and/or closed-loop control device 9, which is used for open-loop and/or closed-loop control of the position of the moveable element 20.

In order to supply power during normal operation of the transmitter 14, the measurement system has a voltage production device 10 which produces an external electrical supply voltage $U_v$ in order to supply power externally to the transmitter 14 via voltage supply lines 11. In the illustrated non-limiting example of the measurement device, the voltage production device 10 forms a component of the open-loop and/or closed-loop control device 9. Of course, the voltage production device 10 may also be arranged outside and independently of the open-loop and/or closed-loop control device 9.

The transmitter 14 has an energy store 13 which, for example, is in the form of a battery or a capacitor, or a combination of both. The energy store 13 produces an auxiliary supply voltage $U_H$. In the event of a failure of the external electrical supply voltage $U_v$, the energy store 13 supplies at least a part of the transmitter 14 with electrical power for a certain time period, such that the stored count of the transmitter is maintained in the memory 8. In this case, the energy store 13 is electrically decoupled from the voltage production device 10 by means of a decoupling diode 12. Upon failure of the external supply voltage $U_v$, the auxiliary supply voltage $U_H$ is applied to the supply lines 11, ignoring the voltage drop across the decoupling diode 12.

When the voltage production device 10 breaks down or is turned off for a relatively long time, and the energy store 13 increasingly empties as a consequence, the auxiliary supply voltage $U_H$ drops with time. When the auxiliary supply voltage has fallen below a critical value, the count in the memory 8 is lost, i.e. it is erased or altered. This results in an incorrectly determined position, which heretofore the open-loop and/or closed-loop control device of a conventional measurement system has been unable to detect, causing faulty open-loop control and/or closed-loop control of the movement of the moveable element.

According to the invention, the transmitter 14 has a clock 24, referred to as transmitter clock in the following description. By way of example, the transmitter clock 24 may be in the form of a crystal clock. The open-loop and/or closed-loop control device 9 is connected to the transmitter 14 via connection 16 for data exchange. The transmitter 14 transmits, e.g., its determined position via the connection 16 to the open-loop and/or closed-loop control device 9. The open-loop and/or closed-loop control device 9 is used, as already stated, for open-loop control and/or closed-loop control of the moveable element, such as, e.g., motor shaft 20. The open-loop and/or closed-loop control device 9 has a computation device 19 which provides appropriate open-loop and/or closed-loop control for a motor in response to the position as determined by the transmitter 14. The open-loop and/or closed-loop control device 9 includes a clock 25, referred to an external clock in the following description. The use of the term "external" merely reflects hereby the fact that clock 25 is not a component of the transmitter 14. Of course, the external clock 25 does not necessarily need to be a component of the computation device 19, as in the exemplary embodiment. Furthermore, the open-loop and/or closed-loop control device 9 has a monitoring unit 15 which may be realized in the form of software executed on the computation device 19. Of course, the monitoring unit 15 may also be implemented in the form of hardware outside the computation device 19. By way of example, the computation device 19 may be in the form of a numerical control (NC control) for a machine.

In the event of a failure of the external electrical supply voltage $U_v$ produced by the voltage production device 10, for example because the open-loop and/or closed-loop control device 9 is switched off, then the electrical voltage supply for the transmitter 14 is still maintained for a certain time period by the electrical energy store 13 which produces the auxiliary supply voltage $U_H$ and, for example, may be in the form of a battery or in the form of a capacitor. In this case, the decoupling diode 12 is used to decouple the external electrical supply voltage $U_v$ from the auxiliary supply voltage $U_H$. In this case, the energy store 13 does not necessarily need to continue to supply all the electrical elements of the transmitter 14 with electrical power, so long as at least the memory 8, which stores the count, and the transmitter clock 24 are supplied with power. However, if the external electrical supply voltage $U_v$ fails for too long, then, after a specific time, the auxiliary supply voltage $U_H$ will fall below a critical value, which is no longer sufficient for an adequate power supply for the memory 8 and the transmitter clock 24. The clock time determined by the transmitter clock 24 would, as a consequence, be erased or at least changed, which means that the count in the memory 8 will also be erased or at least changed. The position determined by the transmitter 14 will thus be incorrect.

After the open-loop and/or closed-loop control device 9 has been switched on again at some later point in time, and the transmitter 14 is therefore once again supplied with electrical power via the voltage production device 10, the transmitter 14 transmits the now incorrectly determined position and the clock time of the transmitter clock 24 via the connection 16 to the open-loop and/or closed-loop control device 9 and, in particular, to the monitoring unit 15. The monitoring unit 15 compares the clock time on the external clock 25 with the clock time of the transmitter clock 24, and as a result of this comparison is able to ascertain whether the determined position is faulty or correct.

In the simplest case, the comparison is carried out, for example, by determining a difference between the clock time of the external clock 25 and the clock time of the transmitter clock 24, and as soon as the magnitude of the difference determined in this way exceeds a specific limit value an incorrectly determined position is identified. The limit value in this case depends on the accuracy of the transmitter clock 24 and of the external clock 25. An evaluation process such as this has the disadvantage that there should be no time offset (time difference) between the transmitter clock 24 and the external clock 25.

This disadvantage can be overcome by skilful advantageous evaluation of the two clock times in the monitoring unit 15. For example, the comparison of the clock times can be carried out in such a way that the monitoring unit 15 determines and stores a first difference between the clock time of the transmitter clock 24 and the clock time of the external clock 25 in the presence of an existing external electrical supply voltage and when a reference mark of the transmitter 14 is detected for the first time, and, after a failure of the external electrical supply voltage $U_v$ and subsequent restoration of the external electrical supply voltage $U_v$, a second difference between the clock time of the transmitter clock 24 and the clock time of the external clock 25 is determined, whereupon the monitoring unit 15 compares the first difference with the second difference.

In the simplest case, the first difference is in this case compared with the second difference by forming the difference between the first difference and the second difference. When the magnitude of the difference between the first difference and the second difference exceeds a preset limit value, then an incorrectly determined position is identified.

The detection of the reference mark for the first time may, for example take place during initial commissioning of the measurement system, after delivery and setting up of the machine.

It will be appreciated by persons skilled in the art that FIG. 1 illustrates only those elements of the transmitter 14 which are essential for understanding. For example, the transmitter 14 may also have a plurality of incremental tracks and/or a plurality of sensor systems 4 for detection, for example, of a fine position (sine/cosine track signals), as well as a plurality of counters and a plurality of counts for detection of the ongoing increments. The energy store 13 then supplies the memory 8 appropriately such that the individual counts are maintained in the event of failure of the external power supply voltage.

Furthermore, it should be noted that the energy store 13 can also be arranged outside the transmitter 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method comprising the steps of:
    storing a count in a memory of a transmitter commensurate with a movement of a movable element to determine a position of the moveable element;
    providing the transmitter with a transmitter clock;
    supplying electrical power from an electrical energy store of the measurement system to at least the memory and the transmitter clock of the transmitter in the event of a failure of an external electrical supply voltage for the transmitter;
    comparing a clock time of the transmitter clock with a clock time of an external clock, when the external electrical supply voltage has been restored; and
    identifying an incorrectly determined position of the moveable element by the transmitter on the basis of the comparison of the clock times.

2. The method of claim 1, wherein the comparing step includes the steps of determining a first difference between the clock time of the transmitter clock and the clock time of the external clock, when a reference mark of the transmitter is first detected, determining a second difference between the clock time of the transmitter clock and the clock time of the external clock, when the external electrical supply voltage has been restored, and comparing the first difference with the second difference.

3. The method of claim 2, wherein the first difference is compared with the second difference by forming the difference between the first difference and the second difference.

4. The method of claim 1, further comprising the step of additionally supplying at least a part of the transmitter with electrical power from the energy store, in the event of a failure of the external supply voltage for the transmitter, such as to count increments which have moved over.

5. A measurement system, comprising:
    a transmitter having a memory to store a count commensurate with a movement of a movable element to determine a position of the moveable element, said transmitter including a transmitter clock;

an electrical energy store which supplies electrical power to the memory and the transmitter clock of the transmitter, in the event of a failure of an external electrical supply voltage for the transmitter; and a monitoring unit which compares a clock time of the transmitter clock with a clock time of an external clock, when the external electrical supply voltage has been restored, to thereby identify the presence of an incorrectly determined position of the moveable element by the transmitter on the basis of the comparison of the clock times.

6. The measurement system of claim 5, wherein the monitoring unit is a component of an open-loop and/or closed-loop control device for closed-loop control of the moveable element.

7. The measurement system of claim 5, wherein the external clock is a component of an open-loop and/or closed-loop control device for open-loop and/or closed-loop control of the moveable element.

8. A motor-operated system, comprising a measurement system as claimed in claim 5.

9. The motor-operated system of claim 8, constructed as a machine tool, production machine, and/or robot.

* * * * *